United States Patent Office 2,811,560
Patented Oct. 29, 1957

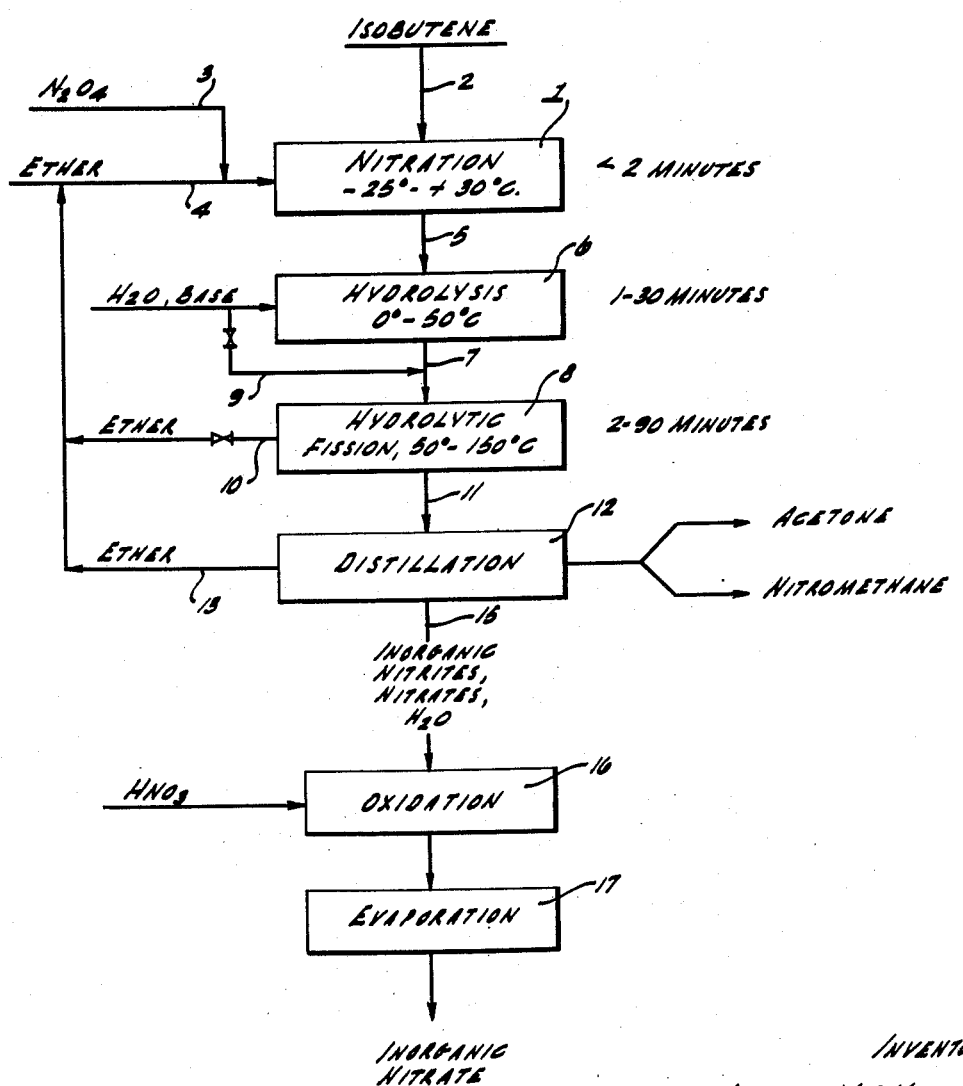

2,811,560

PRODUCTION OF NITROALKANES AND CARBONYL COMPOUNDS

Art C. McKinnis, Long Beach, Calif., assignor, by mesne assignments, to Brea Chemicals, Inc., a corporation of California Application December 10, 1954, Serial No. 474,470

8 Claims. (Cl. 260—597)

This invention relates to the nitration of olefins with nitrogen tetroxide ($N_2O_4$) to produce predominantly addition products containing two atoms of nitrogen per molecule. It relates further to the hydrolytic treatment of the mixed addition products to produce ultimately a nitroalkane and either an aldehyde or ketone, depending upon the particular olefin employed. It has been found firstly that olefins, particularly iso-olefins, may be nitrated with $N_2O_4$ under conditions which practically exclude the formation of oxidation products, mono-nitrated products, and nitroso compounds, the product obtained consisting essentially of a mixture of nitro-nitrites, dinitro alkanes, and nitro-nitrates. Secondly it has been found that the mixture of nitro compounds may, without intervening separation or purification, be subjected to hydrolysis and fission in the presence of water and mildly basic catalysts, under certain novel conditions which result ultimately in the substantially quantitative fission of each of the nitrated products to produce a mono-nitroalkane and either an aldehyde or a ketone.

The intermediate mixture of nitro compounds is useful as such, or it may be resolved into its components, which are useful as chemical intermediates, solvents, plasticizers, explosives, jet fuels and the like. The over-all process however, is conceived as an economical route to nitromethane and other nitroalkanes. Presently employed methods for producing nitromethane require the high-temperature vapor-phase nitration of methane or other alkane with nitric acid. This process is uneconomical from the standpoint of equipment costs, corrosion problems, recovery and recycle of unreacted products, and the inherently low yields and conversions obtained. For example, with methane the maximum yields of nitromethane which have been obtained range between about 20-25%, based on nitric acid. In the present case, the process results in typical yields of nitromethane ranging between about 80-90% of theoretical, based on either $N_2O_4$ or olefin, and yields of aldehyde or ketone ranging between about 60-80%. These results are obtained moreover with relatively non-corrosive reactants, simple apparatus, and economical operating conditions, i. e. low temperatures and liquid phase.

It is therefore an object of the invention to provide a simple and economical method for producing nitromethane or other nitroalkanes, in high yields from inexpensive raw materials. Another object is to provide conditions for the liquid phase, low-temperature nitration of olefins with $N_2O_4$ which will substantially eliminate side reactions resulting in the formation of nitroso compounds, alkyl mono-nitrates, alkyl mono-nitrites and oxidation products, and will also concomitantly increase the yield of those nitrated products which may be hydrolyzed to form nitroalkanes and valuable carbonyl compounds. A further object is to provide hydrolysis conditions best adapted to convert the complex nitration mixture to a nitroalkane and a carbonyl compound, with a minimum of undesirable hydrolytic side-reactions. Other objects will appear hereinafter.

In the case of isobutene, the over-all reactions are apparently as follows:

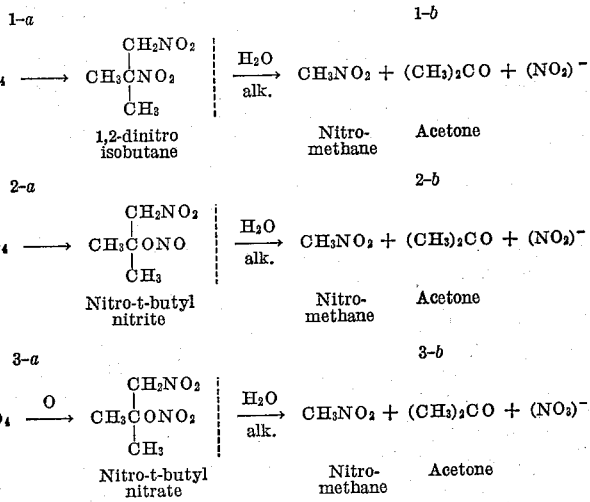

It will be observed in each case that the nitrite and nitrate groups are added to the carbon atom containing the least number of hydrogen atoms, and this is the general case with other olefins. Reaction 3–a takes place to a very small extent in the absence of added oxygen, and more especially under the preferred reaction conditions wherein the contact time is limited to a few seconds.

The nitration step with $N_2O_4$ is preferably conducted in the presence of a suitable ether-type solvent. Suitable solvents include aliphatic, alicyclic, or aralkyl, ethers and esters, preferably those containing from 2 to 6 carbon atoms. Specific examples include dimethyl ether, diethyl ether, methylethyl ether, diisopropyl ether, methylal, dioxane, tetrahydrofuran, ethyl acetate, ethyl propionate, amyl acetate and the like. All of these solvents form addition complexes with $N_2O_4$, which complexes appear to be the actual nitrating agent. It is believed that the formation of such complexes may resolve the $N_2O_4$ into a single tautomeric form, thus inhibiting reaction of tautomeric forms such as $ON-ONO_2$ with the olefin.

The nitration is ordinarily carried out at $-25°$ to $+30°$ C., preferably between about $-10°$ and $+15°$ C., and preferably though not necessarily at atmospheric pressures. Temperatures above the maximum limits result in an undesirable increase in oxidation reactions, while lower temperatures unduly decrease the reaction rate. The nitration is carried out in the liquid phase, but in the case of the lower olefins, it may be desirable to employ a liquid-vapor-phase system with the N₂O₄ and solvent in the liquid phase, and the olefin introduced thereto in the vapor phase. Alternatively, the olefin may be dissolved in the solvent and the resulting solution added to liquid N₂O₄, or to a solution of N₂O₄ in the ether solvent. A second more inert solvent may be employed in the system if desired, e. g. chloroform, carbon tetrachloride, pentane or the like.

It is known that olefins will react with N₂O₄ in the presence of ethers to give dinitrogenated addition products. Early work seems to have resulted in the formation mainly of nitroso compounds, or nitroso-nitrates (U. S. P. 2,402,315). A principal object in the present case is to avoid the formation of nitroso compounds since they do not yield the desired products upon alkaline hydrolysis. Later work (U. S. P. 2,472,550) shows that the formation of nitroso compounds may be substantially reduced by assuring anhydrous conditions during the nitration, and employing a large mole-excess of N₂O₄. However, even under these conditions, the total yield of dinitro, nitro-nitrite, and nitro-nitrate compounds recovered seldom exceeded 65%, based on the olefin, or 80% based on N₂O₄, thus indicating that substantial amounts of other nitrated monomers and/or polymers were formed, as well as olefin oxidation products.

It has now been discovered that substantially quantitative yields, e. g. 85–95%, of the desired dinitrogenated compounds may be obtained, to the practical exclusion of olefin oxidation products and nitroso compounds, by rapidly removing the initially formed nitro compounds from contact with the nitrating agent, in effect limiting the contact time of the N₂O₄ with the nitrated olefins to less than about 2 minutes, preferably less than about 1 minute. Any contact time between about 0.1 second and 2 minutes may be employed, and the formation of undesired by-product will be substantially reduced. Previous methods usually specify a contact time of one to three hours, where the olefin is added gradually to an excess of N₂O₄-ether mixture, and the resulting batch is then worked up for recovery of products. It is further found that if the contact time is limited as described, it is unnecessary to assure completely anhydrous conditions. These phenomena indicate apparently that the addition of nitro and nitrite groups proceeds much more rapidly than does the formation of nitroso groups or nitrate groups. In the case of isobutene it is found that contact times below about 10 seconds at 0° C. are optimum, even when commercial N₂O₄ and ethyl ether are employed, which contain significant amounts of water, e. g. 1–2% by volume in the case of diethyl ether. Under these conditions it is found that the production of nitroso compounds, mono-nitrates, and oxidation products such as alpha-hydroxy-isobutyric acid is substantially nil.

It has been found also that there is no necessity for maintaining either an instantaneous or an over-all mole-excess of nitrating agent, relative to olefin. Hence, the liquid N₂O₄ may be added gradually to an ether solution of the desired olefin, or the reverse order of addition may be utilized. From an economics standpoint it may be desirable to employ an over-all excess of olefin, thereby completely utilizing the N₂O₄, and avoiding obvious problems connected with its recovery and recycle. The excess olefin may be readily recovered and recycled. In batch processes this may entail passing a relatively small stream of olefin through a batch of N₂O₄-ether solvent, and continuing the passage until the N₂O₄ is substantially completely consumed. In continuous reactors, it may entail adding to a flowing stream of liquid N₂O₄-ether, as for example in a tubular reactor, a first increment of olefin, and then adding at least one other increment thereof downstreamwardly, the total olefin added being in mole excess.

The mechanism of the numerous reactions which may occur during nitration are so complex and incompletely understood that a detailed theoretical discussion thereof would probably be misleading, through over-simplification. The process limitations described herein must hence be regarded largely as empirical. However, it is known that water will react with nitrogen tetroxide to yield equilibrium proportions of nitric acid, nitrous acid and nitric oxide. It is believed that all of these materials add to olefins in an undesired manner; nitric acid to yield alkyl mononitrates and nitrous acid to yield alkyl mononitrites. Either of the acids may also result in oxidation to e. g. carboxylic acids. Nitric oxide may result in the formation of nitrogen trioxide:

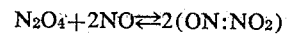

$$N_2O_4 + 2NO \rightleftharpoons 2(ON:NO_2)$$

which may add to olefins to form nitroso-nitrites or nitro-nitroso compounds. None of these intermediate products yield, upon alkaline hydrolysis, the desired end products. Hence, it would appear that the presence of water in the ether-N₂O₄-olefin system is the principal factor which leads to undesired products, unless the precautionary measures outlined herein, e. g. short contact times, are observed. However, it is not intended to exclude other possible contributing factors. Prolonged contact of nitro-nitrites with excess N₂O₄ might be expected to result in oxidation to nitro-nitrates, an effect which is apparently magnified by the addition of oxygen. Long contact times may also favor other relatively slow oxidation reactions.

If it is desired to utilize the nitration mixture as such, or the individual components thereof, this may be accomplished by conventional methods, as by distilling off any excess ether, olefin, or N₂O₄, and then fractionating the resulting nitro compounds. However, caution is necessary in working up the nitration mixture inasmuch as the nitro-nitrite compounds readily decompose, sometimes explosively. It is therefore ordinarily preferable to treat the nitration mixture at low temperatures with water whereby the nitrite compounds are hydrolyzed to form nitro-alkanols wherein the hydroxyl group is attached to the carbon atom to which the nitrite group was formerly attached. The insoluble residue resulting from the low temperature hydrolysis is then a stable mixture of nitro-nitrates and dinitro compounds. The aqueous solution contains the nitro alcohol, which may be recovered by extraction with ether or chloroform for example. If the hydrolysis step is employed, it is preferable to include therein a weak alkali such as calcium carbonate, zinc oxide, calcium hydroxide or the like in order to combine with the liberated nitrous acid formed by hydrolysis. It has been found that the nitrous acid liberated tends to cause further oxidation of the reaction products. The ether solvent may be removed from the nitration product either before or after the hydrolysis.

When the nitration mixture is to be utilized for the ultimate production of a nitroalkane and a ketone, it is ordinarily transferred directly to the low temperature hydrolysis step, without prior separation or purification steps. This is a matter of convenience and economy however; and it is not intended to exclude the separation of excess solvent, nitrogen tetroxide or excess olefin prior to the hydrolysis step.

When the ultimate aim is to produce nitro-alkanes, it has been found that very substantial improvements in yield are obtained if the nitration mixture is first hydrolyzed at low temperatures, e. g. 0–50° C. for a short period of time, e. g. 1–30 minutes, and then subjected to a more severe hydrolytic fission step wherein the temperature is raised to about 50–150° C. and maintained within that range for about 2–90 minutes or more. It is also found that very beneficial results follow when both of the hydrolysis steps are performed in the presence of an alkali, preferably an insoluble or slightly soluble weak alkali. Strong alkalies are disadvantageous because they form water-soluble salts with the aci-form of the nitro-alkanes. In the low temperature hydrolysis step, the alkali serves the purpose of combining with any excess N₂O₄ remaining from the nitration step, and with the nitrous acid liberated during hydrolysis, thereby avoiding the oxidizing effect of nitrous acid. In the high temperature hydrolytic fission step, the alkali, in addition to combining with the liberated nitrous acid, also appears to act as a catalyst for the hydrolytic fission of dinitro alkanes, nitro-nitrates, and nitro alcohols.

The choice of alkali employed in the hydrolysis steps may hinge upon the type of inorganic nitrite which is ultimately desired. While there is some preference for insoluble alkalies such as calcium carbonate, zinc oxide, magnesium oxide, aluminum hydroxide, etc., other stronger alkalies may be employed if care is exercised to avoid a large instantaneous excess thereof which would be available for combining with the nitro-alkanes. By observing this precaution, bases such as potassium hydroxide, sodium hydroxide, ammonium hydroxide, lithium hydroxide, sodium carbonate, sodium bicarbonate, ammonium carbonate, potassium carbonate, potassium bicarbonate, trisodium phosphate, disodium phosphate, sodium acetate, sodium citrate and the like may also be employed. These materials may be added gradually in proportions sufficient to maintain continuously during the hydrolysis reactions a pH between about 4 and 10, preferably between about 5 and 9. In the case of the insoluble alkaline materials such as zinc oxide a stoichiometric excess may be employed and the desired pH range is automatically maintained.

The reactions which occur during hydrolysis and fission are not fully understood, but the more important reactions, as exemplified with the isobutene nitration products, are believed to be as follows:

The actual practice of the invention may perhaps be best understood by reference to the accompanying drawing which is a flowsheet illustrating a particular method for the nitration of isobutene to obtain ultimately nitromethane and acetone. The isobutene, either in vapor phase, liquid phase, or in solution, is admitted to the nitration step 1 through line 2. Liquid nitrogen tetroxide is brought in through line 3 and admixed with diethyl ether in line 4, both of which are then brought into the nitration step. The proportion of nitrogen tetroxide to ether may suitably, though not necessarily, range between about 0.5 and 5 moles of ether per mole of $N_2O_4$. The proportion of isobutene may range e. g. between about 0.6 and 1.5 moles per mole of $N_2O_4$. In the interest of simplicity and to avoid the handling of excessive volumes, the three reactants admitted to the nitration step may be in roughly equal molar proportions, i. e. 1:1:1. The nitration is conducted as previously described, either batchwise in a suitable tank, or continuously in tubular reactor. The temperature of nitration should be controlled as indicated, preferably between about $-10°$ and $+15°$ C. If the nitration is conducted batch-wise, entailing contact residence times in excess of about ten minutes, it is essential that the reactants be substantially anhydrous. On the other hand if the reaction is continuous, and the contact time is limited to less than about 2 minutes, as much as 3–4% by volume of water may be tolerated in the nitration step.

The complete nitration mixture is then transferred via line 5 to the low temperature hydrolysis step indicated at 6, wherein hydrolysis in the presence of water and an

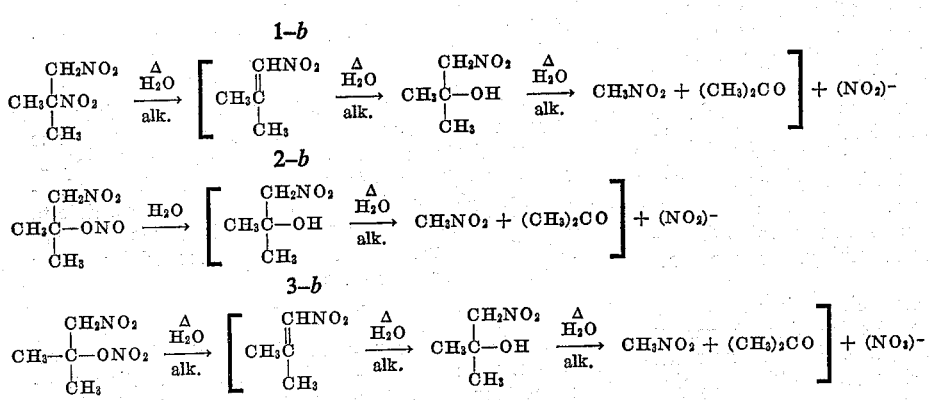

It has not been determined exactly which of the above individual reactions take place during the low temperature hydrolysis, and which take place during the high temperature fission. It does appear however that the initial hydrolysis of nitro-tert butyl nitrite in Equation 2–b occurs exclusively and rapidly during the low temperature hydrolysis, while the final fission of the intermediates to form nitromethane and acetone takes place predominantly or exclusively during the high temperature treatment. It has been observed moreover that lower yields of nitromethane are obtained when the nitration mixture is transferred directly to the boiling hydrolytic medium, without the intervening low temperature hydrolysis. It would appear therefore that it is preferable to eliminate the organic nitrite groups prior to the high temperature fission, probably avoiding thereby the oxidative effects of a sudden large excess of nitrous acid which would be liberated so rapidly at high temeratures as to cause serious oxidation before it is neutralized by the alkali. This seems especially likely where insoluble alkalis such as zinc oxide are employed. It is also possible that the terminal fission reactions are best carried out in the absence of active nitrite groups which might alter the course of reaction. However, in view of the great complexity of possible reactions, it is evident that other explanations may be more accurate.

alkali is conducted at e. g. 0–50° C. for about 1 to 30 minutes. The proportion of water employed is not critical, but there is usually no necessity for employing more than the volume of nitration mixture. The pH of the hydrolysis mixture should be maintained between about 4 and 10, either by limiting the instantaneous proportion of strong alkali, or by employing a weak base. The total proportion of alkali employed should be at least stoichiometrically sufficient to neutralize half of the total organic nitro, nitrite and nitrate groups, as well as any excess unreacted nitrogen tetroxide.

The low temperature hydrolysis mixture is then transferred via line 7, to the high temperature hydrolytic fission step 8, wherein hydrolysis under similar conditions of alkalinity is continued for another 2 to 90 minutes for example, at about 50–150° C. It is feasible at this point to distil off at least a part of the ether solvent through line 10 for recycle to nitration step 1. In case an excess of isobutene was employed, this excess will also ordinarily be withdrawn with the ether in line 10 and recycled. In case strong alkalis are employed in the low temperature hydrolysis step, it may be desirable to add additional alkali via line 9 to the hydrolytic fission stage in order to maintain the desired alkalinity. It is essential however to avoid high alkalinity, especially in the high temperature hydrolytic fission stage, inasmuch as the soluble acinitromethane salts formed are very reactive, and produce undesired products.

At the end of the hydrolytic fission period the reaction mixture is transferred via line 11 to distillation step 12, wherein the products are separated by any desired distillation system. The precise distillation procedure employed will depend upon the nature of the ether solvent employed, but in any event little difficulty is usually encountered in obtaining adequate separation. Any remaining ether is distilled off through line 13 and recycled to line 4. It is preferred to employ lower aliphatic ethers boiling below about 65° C., inasmuch as those materials may either be distilled from the reaction mixture without forming an azeotrope, or, in those cases where water azeotropes are formed, such azeotropes contain less than about 4% of water and hence may be recycled directly to the nitration step if the preferred short contact times are employed therein. Dimethyl ether and ethylmethyl ether for example may be readily recovered without forming an azeotrope. Methylal likewise does not form an azeotrope. Diethyl ether forms an azeotrope with water which however contains only 1.3% water. The methylpropyl ether-water azeotrope contains only about 2% of water. Any of these azeotropes may be recycled directly. However, it is not meant to exclude the possibility of dehydrating the ether distillate prior to recycling. This may be accomplished by conventional methods at slightly added expense.

Nitromethane forms an azeotrope with water which boils at 83.6° C. However the components of this azeotrope are immiscible and hence may be readily separated. No azeotrope is formed between acetone and nitromethane and those materials may hence be readily separated, nitromethane boiling at 101° C. and acetone at 56.4° C.

The residue from the distillation step consists of an aqueous solution of inorganic nitrites and nitrates. The proportion of nitrates is ordinarily small. This mixture may be passed via line 15 to an oxidation step 16 wherein the nitrites are oxidized, as by means of nitric acid, to obtain nitrates. The nitrates may then be recovered in pure form by evaporation at step 17. The inorganic nitrites or nitrates recovered constitute a valuable by-product fertilizer, or they may be utilized for regenerating nitrogen tetroxide.

Many other lower molecular weight olefins may be utilized in a manner similar to that described above. It is preferred to utilize iso-olefins, i. e. those wherein the double bond is linked to a carbon atom which contains no hydrogen atom. These preferred olefins all yield ultimately a nitro-alkane and a ketone. The olefins which yield aldehydes generally do not result in as high yields of nitro-alkane, primarily because of the greater difficulty in effecting hydrolytic fission, and also because of complicating side reactions brought about by the more highly reactive aldehydes. Suitable olefins, together with their final reaction products are illustrated in the following table:

TABLE 1

| Olefin | Reaction Products |
|---|---|
| 1-butene | propionaldehyde, nitromethane. |
| 2-butene | acetaldehyde, nitromethane. |
| 2,3-dimethyl-2-butene | acetone, 2-nitropropane. |
| 2-methyl-2-butene | acetone, nitroethane. |
| 2-methyl-1-butene | methyl-ethyl ketone, nitromethane. |
| methylidene cyclohexane | cyclohexanone, nitromethane. |
| 2,4,4-trimethyl pentene-1 (diisobutene). | methyl neopentyl ketone, nitromethane. |
| 2,4,4-trimethyl pentene-2 | acetone, nitroneopentane. |
| 2,3-dimethyl butene-1 | methyl isopropyl ketone, nitromethane. |
| 2-ethyl butene-1 | diethyl ketone, nitromethane. |
| 2,3,3-trimethyl butene-1 | methyl isobutyl ketone, nitromethane. |
| 2-isopropenyl benzene | acetophenone, nitromethane. |

To further illustrate the novel features of the invention, the following examples are cited, which should not however be considered as limiting in scope:

Example I.—Batch nitration

A. *Nitration.*—Seventy ml. (102 gms.) of redistilled, anhydrous nitrogen tetroxide was added to 400 ml. of anhydrous diethyl ether at −20° C. A stream of oxygen was bubbled through the solution until it became a light brown (originally dark brown), indicating that all $N_2O_3$ was oxidized to $N_2O_4$. Isobutene at the rate of 1.5 s. c. f. per hour was then added, along with a stream of oxygen at the rate of 0.5 s. c. f. per hour. The addition of isobutene and oxygen was continued until the brown color disappeared, indicating that the $N_2O_4$ was completely consumed. The temperature during the nitration ranged from −10° to +14° C. The resulting nitrated product is found to consist almost exclusively of nitro-tert-butyl nitrite, 1,2 dinitro isobutane and nitro-tert-butyl nitrate.

B. *Hydrolysis.*—The nitration mixture from part A was then added with stirring to 1 liter of water at 27° C. containing 1 mole (81 gms.) of zinc oxide. The slurry was then heated slowly to 71–82° C., and maintained in that range for 2 hours while continuously distilling off product at reduced pressure. Forty-six ml. of nitromethane (89% yield, based on 0.5 of original $N_2O_4$) was obtained, and 44 ml. of acetone (54% yield based on 0.5 of original $N_2O_4$).

This example shows that high yields of nitromethane may be obtained in batch scale operation if the reactants are anhydrous, and even though there is not an excess of $N_2O_4$ throughout the nitration.

Example II

The procedure of Example I was repeated except that the nitration mixture from part A was added dropwise to the $H_2O$—ZnO hydrolysis medium while the latter was maintained continuously at 95–98° C. The product was removed continuously as water azeotrope at atmospheric pressure. Fractionation of the product gave 16 ml. of nitromethane (31.5% of theoretical) and 9 ml. of 2-nitro-isobutene. Most of the $N_2O_4$ theoretically convertible to nitromethane was consumed in undesired side-reactions, apparently because fission was not preceded by a low temperature hydrolysis stage.

Example III

Example 1-A was repeated with the nitration temperature controlled at −10°–0° C. The cold nitration product was then added to a slurry of 100 gms. of calcium carbonate in 1 liter of distilled water at room temperature. The resulting mixture was then heated gradually over a period of about 25 minutes to 100° C. The cold mixture was yellow, and changed to buff at 65° C., and to orange at 90° C. The product was then distilled overhead, along with the ether solvent. Fractionation yielded 60 ml. of acetone (77% of theoretical) and 44 ml. of nitromethane (86% of theoretical).

This example shows that calcium carbonate is equally as effective in the hydrolysis step as is zinc oxide. Other alkaline materials are found to function similarly, so long as the pH is not allowed to rise into the range where aci-nitro salts are formed or to fall into the range where appreciable amounts of free nitrous acid are present. For example, in a parallel run employing 1 mole of potassium bicarbonate as the alkali, a 73% yield of nitromethane and a 59% yield of acetone was obtained.

When Examples I and III are repeated, employing undried ether (1–2% water), the nitromethane and acetone yields are substantially reduced. If an excess of $N_2O_4$ is maintained throughout while using undried ether, somewhat better results are obtained, but not as good as when dry reactants and stoichiometric proportions of $N_2O_4$ are employed.

Example IV.—Continuous nitration

A coiled tubular reactor, 2 mm. in inside diameter and 12 ft. in length was constructed and immersed in an ice bath. The outlet led through a condenser to a flask equipped with a mechanical stirrer containing the hydrolysis medium. Liquid diethyl ether was pumped into the inlet of the reactor by means of a constant rate pump. A stream of oxygen plus nitrogen was bubbled through a reservoir of liquid nitrogen tetroxide at about 0° C., and the total gas stream was then admitted to the inlet ether line. Liquid isobutene was metered into the inlet line at a point downstreamward from the $N_2O_4$—$O_2$—$N_2$ inlet. In all cases the ice bath was maintained at 0 to +5° C.

*Run 4-a.*—Anhydrous diethyl ether and redistilled $N_2O_4$ was employed. The ether was pumped in at the rate of about 180 ml./hr. the oxygen and nitrogen flow rates through the liquid $N_2O_4$ were 1.2 and 0.4 s. c. f. per hour, respectively. Isobutene was added at the rate of 1.2 s. c. f. (1.5 moles) per hour. The nitration product was continuously passed into the hydrolysis flask containing 80 gms. of zinc oxide in 1 liter of distilled water. The temperature of the hydrolysis flask was maintained at about 23–26° C. throughout the nitration period of one hour. During this period 67 gms. (0.73 mole) of $N_2O_4$ had been passed through the reactor. The liquid residence time in the nitration reactor was about 5 sec., as determined by timing the passage of a color-indicator therethrough.

At the end of one hour the nitration was interrupted, and the contents of the hydrolysis flask, together with 10 ml. of undecanol to prevent foaming, were heated to boiling and the final products distilled overhead and fractionated. Substantially all of the ether and unreacted isobutene was recovered, and 37 gms. of nitromethane (83% of theoretical) and 33 ml. of acetone (62% of theoretical).

*Run 4-b.*—Run 4-a is repeated employing commercial $N_2O_4$ and the water azeotrope of diethyl ether containing about 1.3% by volume of water. The yield of nitromethane and acetone is the same as in run 4-a, within experimental error, showing that the deleterious effects of water are overcome by operating at short contact times. No appreciable decrease in yield is noted with nitration mixtures containing up to 3% by volume of water.

*Run 4-c.*—The procedure of run 4-a is repeated omitting the use of oxygen. The nitrogen flow rate through the reactor was increased to 1.6 s. c. f. per hour. Again the yield of nitromethane is greater than 80% and of acetone about 65%, based on $N_2O_4$, showing that oxygen is not necessary at short contact times.

*Run 4-d.*—The procedure of run 4-a is repeated with an oxygen flow rate of 0.6 s. c. f. per hour and a nitrogen flow rate of 0.2 s. c. f. per hour, whereby the residence time in the reactor is approximately doubled (10 sec.). The yield of nitromethane is about 65% and of acetone about 45%, showing that the 5 sec. contact time is preferable to 10 sec.

*Run 4-e.*—Run 4-a is repeated, but the nitration product is passed directly into a boiling (100° C.) zinc oxide hydrolysis mixture. The nitromethane yield is about 45%.

Example V

Gaseous propylene is subjected to nitration under conditions similar to those described in Example 1-a, with the nitration temperature being maintained at 0° C. The resulting nitrated product is then poured into one liter of boiling water. Hydrolysis is continued for about 1 hour, during which time a 20% yield of nitropropylene was distilled overhead. The remaining aqueous solution is found to contain a large proportion of 2-nitro isopropanol and polymerized nitro propylene. The nitro alcohol is more resistant to hydrolytic fission than are the nitro-tertiary alkanols.

By nitrating a stream of propylene continuously as described in Example 4-a, with a 1 minute liquid residence time, and passing the nitrated product into cold water, a similar yield of total nitrated products is recovered.

Example VI 70 ml. of commercial nitrogen tetroxide were added to 400 ml. anhydrous diethyl ether at −20° C. Oxygen was passed through the mixture until it became light brown in color. Di-isobutylene (156 ml.) was then added at a rate of 60 drops per minute while continuing to pass oxygen through the mixture at the rate of 0.5 s. c. f. per hour. The nitration temperature was maintained about −8° C.

The nitration mixture was then poured into a slurry of 100 gms. calcium carbonate in 1 liter of water and the slurry was gradually heated with stirring. Fractionation of the distillate resulted in the recovery of 20 grams of nitromethane and 49 grams of methyl neopentyl ketone.

Substantially similar results are obtained when other isoolefins are employed in the above examples. Similarly, essentially the same results are obtained when other ether type solvents are employed, with the exception that the final product recovery system must be modified to account for the different boiling points.

It is contemplated that many changes may be made in the various details of the process. The true scope of the invention should therefore not be considered as limited to the above description, but is intended to be embraced by the following claims.

I claim:

1. A method for preparing a lower nitroalkane and a lower aliphatic ketone from an addition product of nitrogen tetroxide and a lower isoolefin, said addition product including both a dinitro alkane and a nitro-alkyl-nitrite, which comprises contacting said addition product in a first contacting stage with an aqueous alkaline hydrolytic reagent at a temperature between about 0° and 50° C. for a period of time sufficient to hydrolyze substantially all organic nitrite groups to hydroxyl groups but insufficient to effect any substantial fission of carbon-to-carbon bonds, then continuing said contacting in a second stage at a temperature between about 50° and 150° C. for a period of time sufficient to effect fission of substantially all nitro compounds containing the same number of carbon atoms as the original olefin, maintaining the pH in each of said hydrolytic contacting stages at between about 4 and 10, and thereafter recovering a nitroalkane and a ketone from the hydrolysis mixture.

2. A method for preparing nitromethane and acetone from an addition product of nitrogen tetroxide and isobutene, said addition product including both 1,2-dinitro isobutane and nitro-tert-butyl nitrite, which comprises contacting said addition product in a first contacting stage with an aqueous alkaline hydrolytic reagent at a temperature between about 0° and 50° C. for a period of time between about 1 and 30 minutes to thereby effect hydrolysis of nitrite groups, then continuing said hydrolytic contacting in a second stage at a temperature between about 50° and 150° C. for a period of time between about 2 and 90 minutes to effect fission of substantially all nitro compounds containing four carbon atoms, maintaining the pH in each of said hydrolytic contacting stages at between about 4 and 10, and thereafter recovering nitromethane and acetone.

3. A process as defined in claim 2 wherein said hydrolytic reagent comprises water and zinc oxide.

4. A process as defined in claim 2 wherein said hydrolytic reagent comprises water and calcium carbonate.

5. A method for preparing a lower nitroalkane and a lower aliphatic ketone which comprises contacting a lower isoolefin with liquid nitrogen tetroxide at a temperature between about −25° and +30° C. in the presence of a solvent which is essentially a water azeotrope of an aliphatic ether boiling below about 65° C., said contacting being effected by (1) continuously admixing said ether-water azeotrope, nitrogen tetroxide and olefin, (2) immediately thereafter passing the resulting mixture through an elongated tubular reactor maintained at a temperature between about −25° and +30° C., (3) adjusting the flow rate of said mixture through said reactor so as to maintain a liquid residence time therein between about 0.1 second and 2 minutes, to produce thereby an intermediate mixture of addition compounds including a dinitro alkane and a nitro-alkyl-nitrite, contacting said intermediate mixture with an aqueous alkaline hydrolytic reagent at a temperature sufficiently high to effect hydrolytic fission of said addition compounds while maintaining the pH of the hydrolysis mixture at between about 4 and 10, distilling said ether-water azeotrope from the hydrolysis mixture and recycling said azeotrope to said nitration contacting step, and thereafter recovering a nitroalkane and a ketone from the hydrolysis mixture.

6. A method for preparing nitromethane and acetone which comprises contacting isobutene with liquid nitrogen tetroxide at a temperature between about −25° and +30° C. in the presence of a solvent which is essentially a water azeotrope of an aliphatic ether boiling below about 65° C., said contacting being effected by (1) continuously admixing said ether-water azeotrope, nitrogen tetroxide and isobutene, (2) immediately thereafter passing the resulting mixture through an elongated tubular reactor maintained at a temperature between about −25° and +30° C., (3) adjusting the flow rate of said mixture through said reactor so as to maintain a liquid residence time therein between about 0.1 second and 2 minutes, to produce thereby an intermediate mixture of addition compounds including 1,2-dinitro isobutane and nitro-tert-butyl nitrite, contacting said intermediate mixture in a first contacting stage with an aqueous alkaline hydrolytic reagent at a temperature between about 0° and 50° C. for a period of time between about 1 and 30 minutes to thereby effect hydrolysis of nitrite groups, continuing said hydrolytic contacting in a second stage at a temperature between about 50° and 150° C. for a period of time between about 2 and 90 minutes to effect fission of substantially all nitro compounds containing 4 carbon atoms, maintaining the pH in each of said hydrolytic contacting stages at between about 4 and 10, distilling said ether-water azeotrope from the hydrolysis mixture and recycling said azeotrope to said nitration contacting step, and thereafter recovering nitromethane and acetone from the hydrolysis mixture.

7. A process as defined in claim 6 wherein substantially equal mole-ratios of isobutene and nitrogen tetroxide are employed in said nitration, whereby the nitration effluent passed to said hydrolytic contacting is substantially free of isobutene and nitrogen tetroxide.

8. A process as defined in claim 6 wherein the mole-ratio of isobutene nitrogen tetroxide employed in said nitration step is greater than 1, whereby the nitration effluent passed to said hydrolytic contacting is substantially free of nitrogen tetroxide.

References Cited in the file of this patent

UNITED STATES PATENTS

| | | |
|---|---|---|
| 2,314,615 | Franklin et al. | Mar. 23, 1943 |
| 2,402,315 | Crowder | June 18, 1946 |
| 2,460,243 | Scaife et al. | Jan. 25, 1949 |
| 2,472,550 | Smith | June 7, 1949 |
| 2,478,243 | Coe et al. | Aug. 9, 1949 |

OTHER REFERENCES

J. Chem. Soc. (Levy et al.): 1948, London, pp. 52–60.